United States Patent [19]

Williams

[11] Patent Number: 4,992,857
[45] Date of Patent: Feb. 12, 1991

[54] SYSTEM FOR DISTRIBUTING AND RECOVERING DIGITIZED COMPOSITE SECAM SAMPLES IN A TWO CHANNEL DIGITAL APPARATUS

[75] Inventor: Robert A. Williams, Redwood City, Calif.

[73] Assignee: Ampex Corporation, Redwood City, Calif.

[21] Appl. No.: 252,727

[22] Filed: Sep. 30, 1988

[51] Int. Cl.⁵ .............................................. H04N 9/64
[52] U.S. Cl. ...................................... 358/36; 360/22; 358/314
[58] Field of Search ............... 358/21 R, 14, 310, 314, 358/13, 12, 37; 360/22, 38.1, 23

[56] References Cited
U.S. PATENT DOCUMENTS
4,277,807  7/1981  Baldwin .............................. 358/314

Primary Examiner—James J. Groody
Assistant Examiner—David E. Harvey
Attorney, Agent, or Firm—George B. Almeida

[57] ABSTRACT

A technique for concealing large data losses such as the 50% data loss experienced when a data channel of, for example, a two channel composite SECAM digital video apparatus is lost. The digitized video samples are grouped and the groups are distributed into alternate channels of the two digital channels. Upon receiving the data, a channel multiplexer reassembles the groups of samples. If a data channel is lost, the sample distribution pattern cooperates with selected algorithms in a compromise which allows the system to recover sufficient luminance and chrominance information to provide acceptable concealment of the lost data.

14 Claims, 6 Drawing Sheets

SYSTEM FOR DISTRIBUTING AND RECOVERING DIGITIZED COMPOSITE SECAM SAMPLES IN A TWO CHANNEL DIGITAL APPARATUS

BACKGROUND AND SUMMARY OF THE INVENTION

The present invention relates to the recording and reproducing of digitized composite SECAM signals and, more particularly, to the selected distribution of digitized composite SECAM samples into two digital recording or transmission channels, and to the recovery of the distributed pattern of recorded or transmitted samples, particularly in the event of a channel failure.

As is well known in the television industry, the SECAM color television standard used in France and Russia differs from the other world color television standards NTSC, PAL, and PAL-M. Briefly, instead of transmitting two chrominance signals simultaneously as in the other standards, the SECAM system transmits the chrominance signals sequentially. However, the two chrominance signals are required by the receiver simultaneously in order to produce the correct color. This is achieved in the SECAM system by storing the information of one line such that the same information then can be used for two lines which are adjacent in time. Since the chrominance signals are consecutively stored for a period of a line, and are used again for a respective adjacent line, during the period of any line both the chrominance signals are available simultaneously as required. Hence the proper chrominance signals can be combined together with the luminance signal, to produce the correct color signal.

Another distinction between the SECAM and other standards is that in the SECAM system the chrominance is encoded using FM modulation instead of quadrature, or phase, modulation as is used in NTSC, PAL and PAL-M. Since the frequency modulation process inherently is non-synchronous, and herein varies according to the modulating chrominance signal, the sampling rate of the SECAM system is non-synchronous to the chrominance information regardless of what sampling rate is selected.

Because of the special synchronous phase relationship of samples in NTSC, PAL and PAL-M systems, concealment algorithms with high performance are possible even in the event that large losses of data occur. For example, in the relatively new field of composite digital videotape recording systems (generally known as the D-2 format), the recording format employs two data recording channels and a respective pair of recording heads. Thus, a loss of a data channel such as may be caused, for example, by a clogged head, results in a 50% loss of data. The NTSC, PAL and PAL-M systems are able to conceal such large data losses. In SECAM however, as discussed above, there is no special phase relationship among the samples. It follows that, in the SECAM system, if a single sample is lost, or a number of samples significantly fewer than 50% of the data such as for example 10% are lost, a reasonably good filter can be designed to replace it based on the adjacent information on the same line of data. However, with a more extensive loss of data such as the loss of one channel in the two channel digital system of previous mention, or in the event of large dropouts of the order of from 10% to less than 50% of the data, full color concealment becomes impossible in the SECAM system.

More particularly, current composite digital videotape recorders such as those employing the D-2 format, distribute alternate samples to the two recording channels. When one channel of information is lost as when a head clogs, the SECAM color difference signal cannot be recovered because it is above the Nyquist limit of a single channel. Thus in such a two channel system, if every alternate sample is lost, a system using the SECAM standard cannot recover the chrominance information. This is due to the fact that in the SECAM system, the luminance information has a frequency spectrum of from zero to 3 megaHertz (MHz), while the chrominance information has a frequency spectrum of from 3.9 to 4.8 MHz. Given the usual sampling rate of approximately 16 MHz, then the Nyquist limit is 8 MHz. If alternate samples are arbitarily removed from the data stream, as in the example above where one channel of information is lost, the Nyquist limit is reduced to 4 MHz. Since the frequency band of from 4 to 5 MHz corresponding to the chrominance information is now lost, the chrominance information cannot be recovered in the SECAM system.

Accordingly, it would be highly desirable to provide a technique whereby a SECAM system readily can perform concealment of missing data, even in massive data loss approaching or equaling a 50% data loss such as when one of two channels of data is lost.

To this end, the invention contemplates, inter alia, the grouping of digital samples in select multiples per group, wherein alternate groups of samples are distributed for recording (or transmission) on alternate tracks via respective channels. By way of example only, it has been found that, given a sampling rate of the order of 16 MHz, the most effective and thus preferred number of samples per group is four. Thus, for reasons of simplifying the description, the invention combination herein is illustrated and described using a sample distribution pattern, and a luminance/chrominance data recovery algorithm, of four samples per group. However, given a sampling rate of the order of 12 MHz, the preferred number of samples per group is three, as further discussed below.

More particularly, given a SECAM system with a sampling frequency on the order of 16 MHz, grouping four adjacent samples together and distributing successive groups of four between alternate channels, causes a re-distribution of which frequency information is lost in the event of loss of a channel of data. That is, the use of groups of four samples on alternate channels, allows the recovery of luminance information in the spectrum of from zero to 1 MHz and chrominance information in the frequency spectrum of from 3 to 5 MHz. Thus in the SECAM system, the distribution of four samples per group in alternate recording tracks is, in effect, a compromise between the frequencies of the spectrum which are lost and those which are recoverable. For example, there is a loss in luminance information in the range of from 1 to 3 MHz, which constitutes mostly fine detail luminance information. Although the loss of detailed luminance causes a loss in resolution, the recovery of the low frequency luminance allows the recovery of a full color picture. On the other hand, the four sample distribution pattern provides a recoverable frequency spectrum of from 3 to 5 MHz, which advantageously allows recovering all the chrominance information between 3.9 and 4.8 MHz. Accordingly, even with a loss of half of the data due to the loss of a channel, sufficient luminance and chrominance information can be recovered in a SECAM system to allow acceptable concealment of the missing data.

The invention further contemplates receiving (for example, upon playback), the luminance and chrominance information via the sample distribution pattern, and performing the concealment process utilizing the multiple sample grouping and a selected algorithm, or algorithms. To this end, given the loss of one channel of data, in one algorithm the luminance and chrominance information is recovered by taking an average of the fourth previous sample and the fourth following sample on the line. In another algorithm which recovers further luminance information, in the simplest approach using only information on the same line as that having missing samples, the average is taken of all four previous and four following samples before and after the missing samples. For still higher resolution, vertical luminance detail may be obtained by first averaging groups of four adjacent surrounding samples before and after the missing data, and then averaging the four vertically adjacent surrounding samples above and below the missing samples.

The concealment technique then takes a weighted average of the resulting horizontal and vertical luminance averages to thereby recover luminance for the missing samples. The luminance and chrominance information then are combined to provide the SECAM full color signal.

DESCRIPTION OF THE PREFERRED EMBODIMENTS

Figure 1:
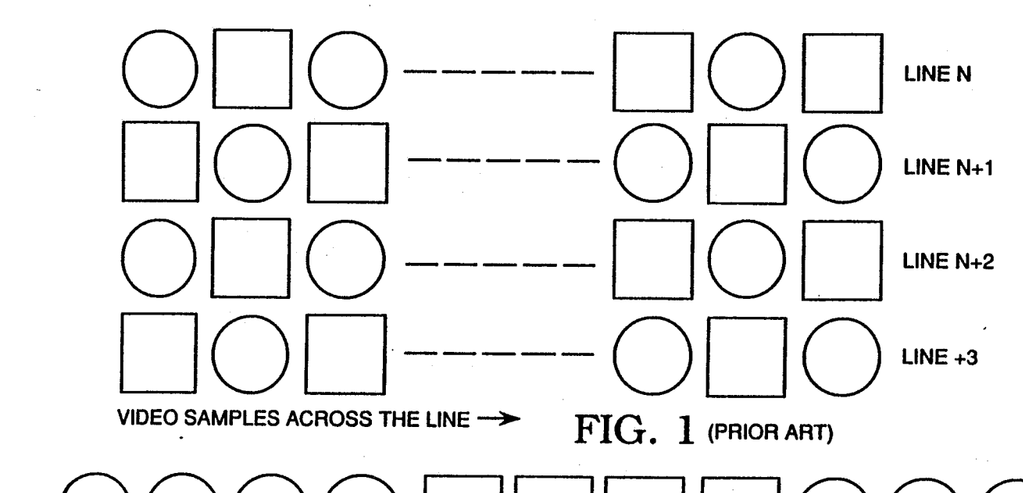
FIG. 1 is a pictorial representation of the sample distribution pattern in a digital videotape recorder system using the NTSC, PAL or PAL-M color television standards.

FIG. 1 is a pictorial representation of video samples across several horizontal lines N through N+3, of a video raster depicting the distribution of video samples via a respective pair of channels recorded in magnetic tape in, for example, NTSC and PAL composite digital videotape recorder systems. To illustrate, the samples shown by a circle are directed to one channel of the digital recorder system for recording in one track, while the samples shown by a square are directed to the second channel for recording in a second track. Thus it may be seen that single alternate samples are directed to alternate tracks. If a channel of data is lost due to, for example, a clogged head, resulting in a 50% loss of data, this channel distribution pattern works well for the NTSC and PAL standards, but is unacceptable for the SECAM color television standard for reasons discussed below. The alternate sample distribution is usable in the NTSC and PAL standard because of the well known special phase relationship of samples to synchronizing signals, whereby concealment algorithms with high performance are available to correct data losses such as, for example, the channel loss of 50% of data mentioned above.

However as mentioned above, in the SECAM system there is no special phase relationship among the samples, nor with reference to vertical sync. For a usual SECAM system with a video sampling rate of approximately 16 MHz and a sample distribution pattern such as that shown in FIG. 1, the new Nyquist limit with one channel missing drops from about 8 MHz to 4 MHz. The SECAM video signal, however, has chrominance information in the 3.9 to 4.8 MHz frequency band (FIG. 9) and accordingly virtually all this information is lost. It follows that in a SECAM system full color concealment under these circumstances becomes impossible for any but the smallest dropouts.

Figure 2:
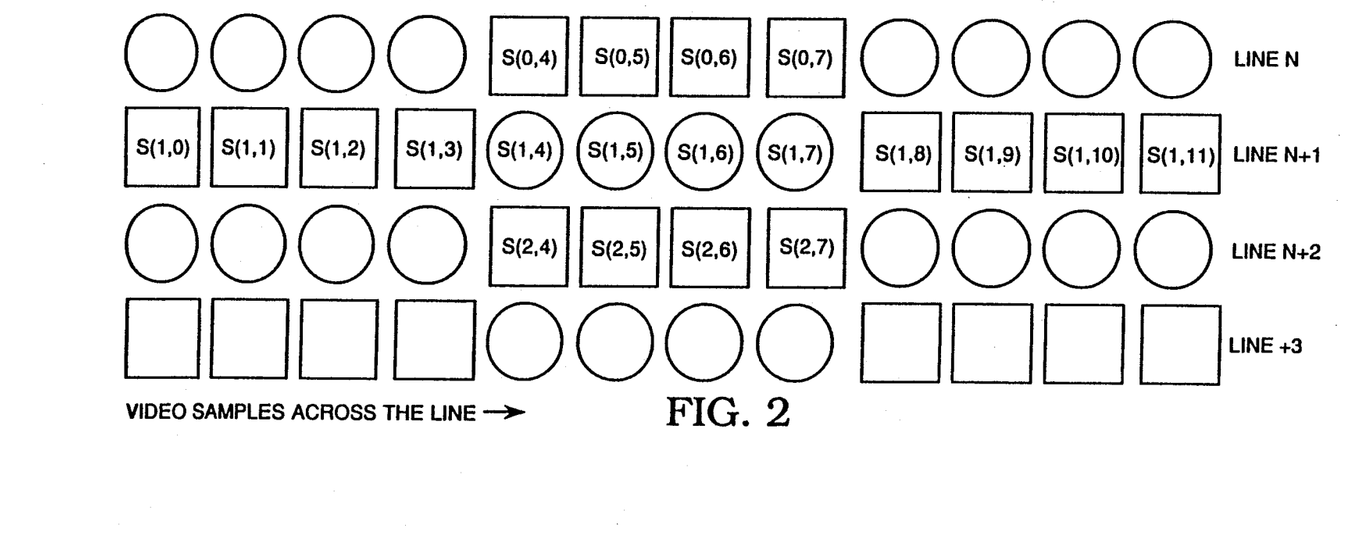
FIG. 2 is a pictorial representation of the sample distribution pattern in accordance with the invention for a digital videotape recorder system using a SECAM color television standard.

In accordance with the invention, the disadvantages of the sample distribution pattern of FIG. 1 for NTSC and PAL standards are circumvented in the SECAM color television system by the use of the sample distribution pattern exemplified in FIG. 2. The preferred embodiment depicted herein illustrates the use of four samples in a group, with successive groups being directed to alternate channels and thus to alternate recording tracks. Although 50% of the data still is lost in the event of the loss of a channel, the frequencies of the lost signals are re-distributed to optimize the frequencies recovered, whereby sufficient luminance and chrominance information is recovered to allow reconstructing the lost data. That is, sufficient low frequency luminance information and adequate chrominance information is recovered to allow an acceptable concealment to be performed.

The invention further contemplates algorithms for recovering the luminance and chrominance information via the unique sample distribution pattern of FIG. 2, without the disadvantage of having to use a full line replacement method, as currently done in SECAM analog videotape recorder systems. Such concealment algorithms depend upon the preselected channel distribution pattern exemplified in FIG. 2.

Figure 3:
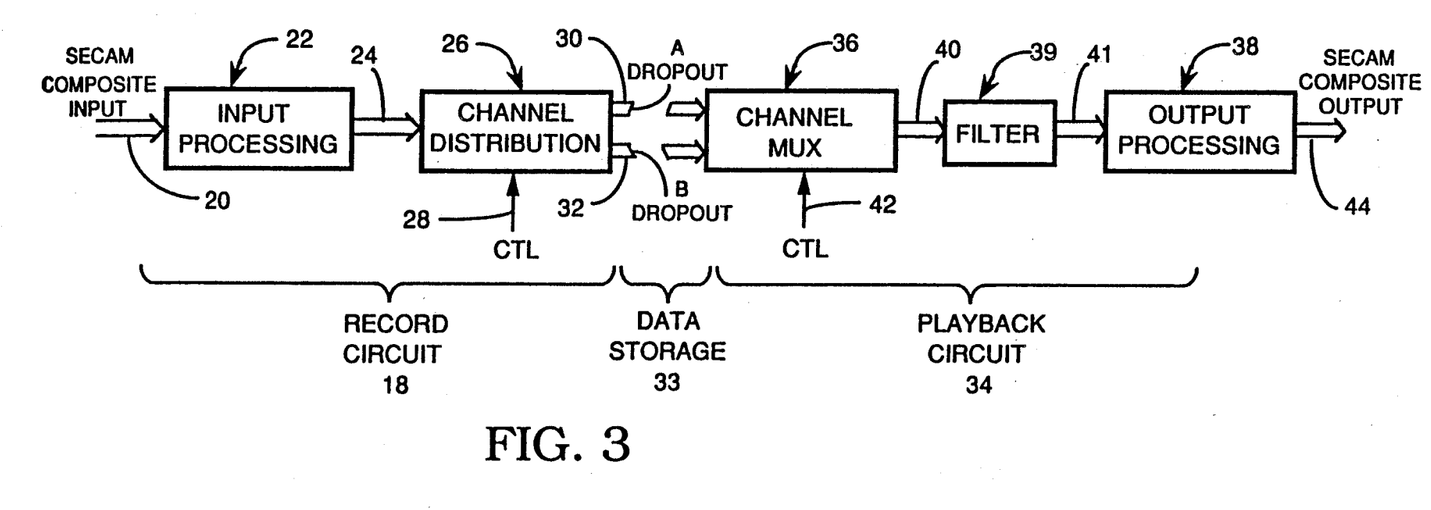
FIG. 3 is a block diagram depicting a digital videotape recording and reproducing system environment for the invention combination.

FIG. 3 illustrates a digital videotape recorder/reproducer system environment in which the sample distribution and recovery system of the invention is utilized. More particularly, a SECAM composite video input signal is supplied, via an 8-bit bus 20, to an input processing circuit 22 of a record system 18. The circuit 22 provides various signal processing functions such as stripping sync, sample clock acquisition, color framing, picture positioning, etc., which are the usual functions provided by a conventional video input board of a videotape recorder. The processed signal is supplied via a bus 24 to a channel distribution means 26, which provides the sample distribution pattern shown in FIG. 2 in response to control signals on multiple control and timing lines 28. By way of example only, the stream of digitized video samples introduced to the channel distribution means 26 herein preferably is broken up into groups of four samples, which groups are supplied alternately to a channel A on a bus 30 and to a channel B on a bus 32. More particularly, the samples represented as circles in FIG. 2 may be supplied to channel A of a data storage apparatus 33 via the bus 30, while the samples represented by squares may be supplied to channel B via the bus 32. Thus the groups of samples are divided between the channels A and B of the data storage apparatus 33, which may comprise, for example, the magnetic video tape of a digital videotape recorder.

The recorded channels of information are subsequently played back from the data storage apparatus 33 by a playback system 34, and it is during this playback process that the dropouts or loss of a data channel will be experienced. To simulate the loss of one channel corresponding, for example, to a 50% loss of data, an A dropout switch, and a B dropout switch, are depicted in channels A and B, respectively. The loss of a data channel is simulated by opening the switch corresponding to the channel. Upon the occurrence of the loss of 50% of the data, the playback system 34 recovers the available data in the preselected sample distribution pattern, and invokes a concealment algorithm to replace any missing data, in accordance with the invention as further described below.

To this end, a channel multiplexer means 36 of the playback system 34 is supplied with the digital data from the data storage apparatus 33 via channels A and B, selectively recombines the two channels of data, and supplies the recombined data stream to a filter means 39 via a bus 40. The combining is controlled by control and timing signals supplied via multiple control and timing lines 42. An output processing circuit 38 is coupled to the filter means 39 via a bus 41. The filter means 39 is implemented in accordance with the concealment algorithm further described below, and comprises one example of an error concealment circuit in accordance with the invention. In the event of a channel loss or other loss of data, the filter means 39 performs the error concealment utilizing the alternate groups of four samples in FIG. 2 and the error recovery technique based on the algorithms further described below. The output processing circuit 38 performs the usual output processing functions such as regeneration of sync, color processing for special playback functions such as slow motion, tape speed override (TSO), black level and gain adjustments. The circuit 38 then supplies the resulting SECAM composite color signal via the output bus 44.

Figure 4:
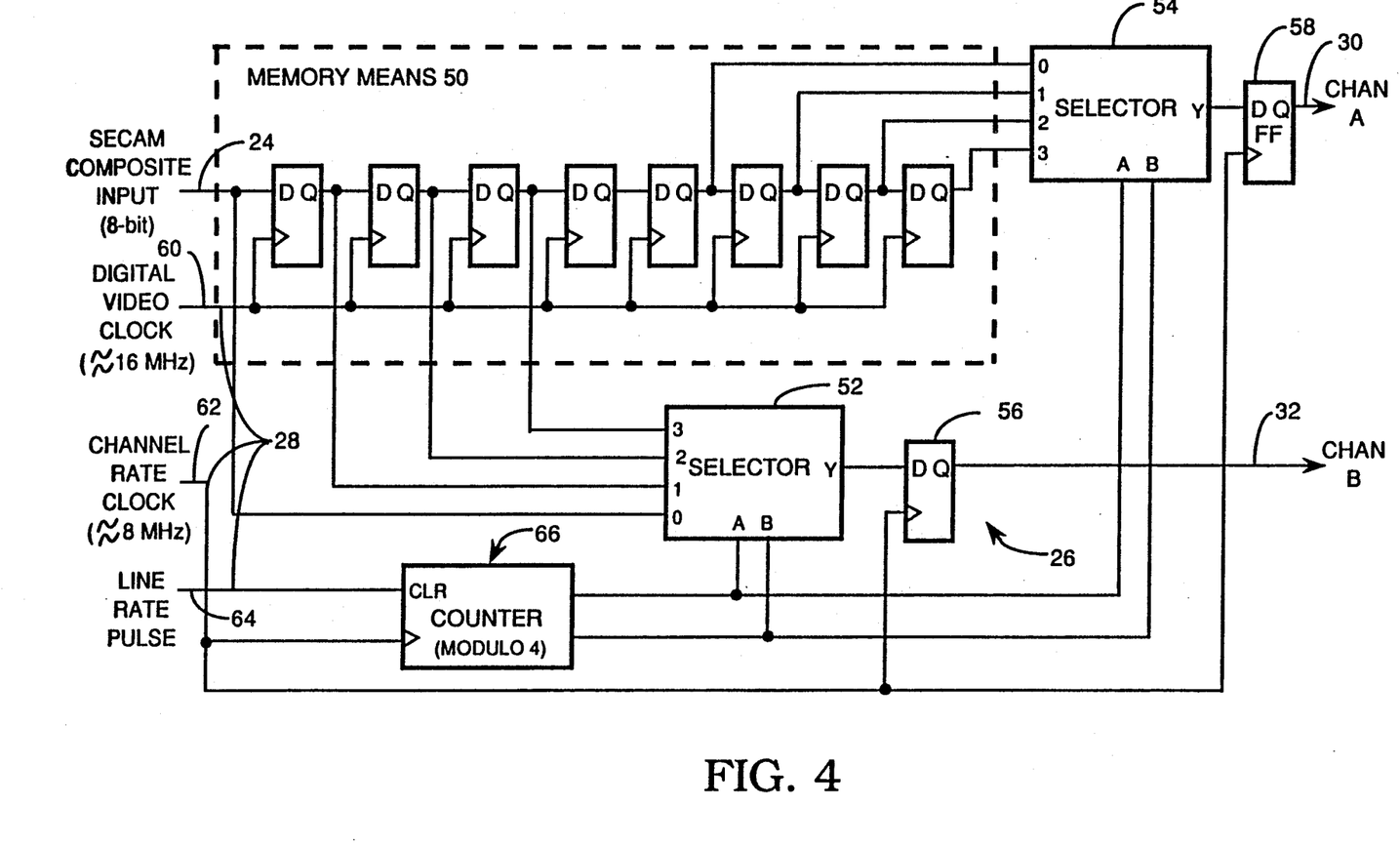
FIGS. 4 and 5 are schematic diagrams depicting portions of the invention combination of FIG. 3 in greater detail.

Referring now to FIG. 4, an exemplary implementation of the channel distribution means 26 of FIG. 3 is depicted, wherein like components have similar numbers. Thus the SECAM composite video input is supplied in successive 8-bit words to a memory means 50 via the bus 24. By way of example, given a video input of 8 bits as illustrated herein by way of example only, the memory means 50 may comprise an 8×8 shift register. For purposes of simplicity of description, a single bit path of the video signal and of the various video circuits is shown herein. The video input is coupled to the first of eight serially coupled D-type flip-flops of memory means 50, and also is connected to a first input of a selector circuit 52. The outputs of the first three flip-flops of memory means 50 also are connected to the next three inputs, respectively, of the selector circuit 52. Likewise, the fifth through eighth flip-flops of the means 50 are coupled to the four inputs of a second selector circuit 54. The Y outputs of the selector circuits 52, 54 are coupled to respective D-type flip-flops 56, 58. The Q outputs of the latter are coupled to respective buses 30 and 32, respectively, corresponding to the channels A and B of previous mention in FIG. 3. The flip-flops 56, 58 enable an output data rate equal to the input data rate.

The memory means 50 and selector circuits 52, 54, are controlled via the multiple control and timing lines 28 of previous mention. The lines 28 include a digital video clock of the order of 16 MHz on a line 60, a channel rate clock of the order of 8 MHz on a line 62, and a line rate pulse on a line 64. The digital video clock provides the clock for the array of flip-flops of the memory means 50. The channel rate clock provides the clock for the flip-flops 56, 58, as well as the clock for a modulo 4 counter 66. In turn, the counter 66 is cleared by the line rate pulse on line 64, wherein the line rate pulse in effect corresponds to a write pulse which occurs at the start of each active video line. The output of the counter 66 is supplied to the A, B ports of the selector circuits 52, 54, and cycles the selector circuits through the respective four input signals supplied to each selector, starting with a count of zero at the beginning of an active video line.

It may be seen that the channel distribution means 26 of FIG. 4 performs the function of alternately supplying groups of four samples of a data stream to alternate channels A and B. In turn, the alternate groups of four samples are alternately digitally recorded in two tracks of the associated videotape recorder. In effect, the channel distribution circuit 26 operates as a switching means for routing sample groups of a selected number of samples to alternate recording tracks of a recording medium of the data storage apparatus 33.

Figure 5:
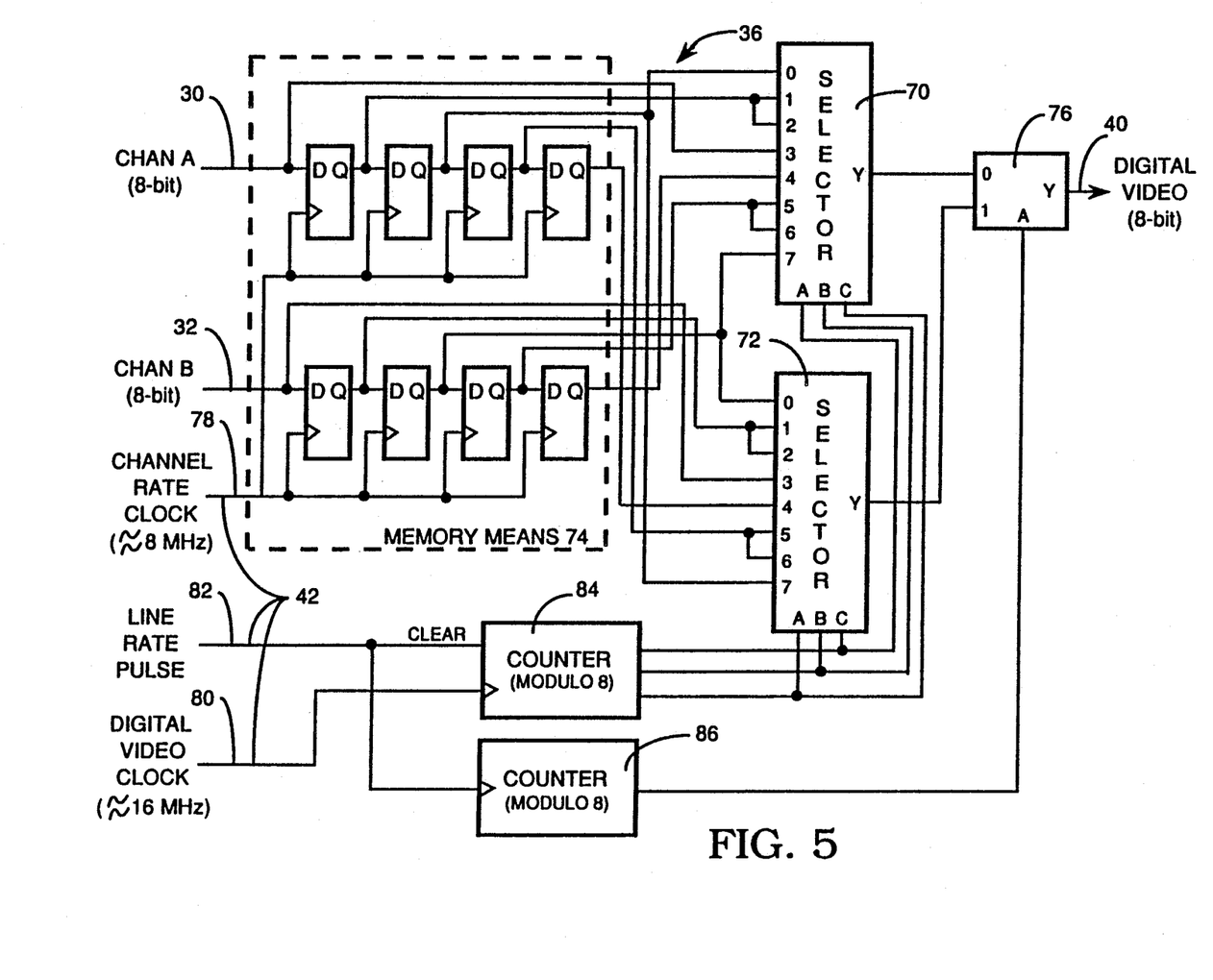

Referring now to FIG. 5, the channel multiplexer means 36 of FIG. 3 is depicted in further detail with like components having similar numbers. The alternate groups of samples from the data storage apparatus 33 are supplied via the channels A and B to respective first of four D-type flip-flops connected in series, as well as to respective inputs of a pair of selector circuits 70, 72. The latter each have eight inputs and a Y output. As in FIG. 4, the flip-flops define in effect a memory means 74. The outputs of each of the two series of four flip-flops are coupled to the remaining inputs of the selector circuits 70, 72 as illustrated in the FIG. 5. The Y outputs of the selector circuits 70, 72 are coupled to respective inputs of a selector circuit 76, whose Y output in turn is the 8-bit digital video signal on the 8-bit bus 40.

The memory means 74 and selector circuits 70, 72, 76 are controlled via the multiple control and timing lines 42 of previous mention in FIG. 3. The lines 42 include signals corresponding to the control signals on lines 28 of FIG. 4; namely, the channel rate clock of the order of 8 MHz on a line 78, the digital video clock of the order of 16 MHz on a line 80, and the line rate pulse on a line 82. The channel rate clock provides the clock for the flip-flops of the memory means 74. The digital video clock provides the clock for a modulo 8 counter 84. The line rate pulse provides a clock for a modulo 2 counter 86, as well as a clear pulse to the counter 84. The modulo 8 counter 84 provides select signals to the A, B, C select inputs of the selector circuits 70, 72, which thus cycle the latter circuits through the eight video input signals supplied by the memory means flip-flops. The modulo 2 counter 86 provides a control signal to the A select input of the selector circuit 76, which selects the alternate lines of video to combine accordingly the alternate groups of four samples into the continuous 8-bit digital video signal appearing at the bus 40.

In the event of a loss of a data channel, or the occurrence of a large dropout, the playback system 34 of FIGS. 3, 5, and 6 described below, invokes one or more concealment algorithms, wherein two parts of one algorithm are described herein by way of example only. The first part recovers the chrominance, as well as adequate luminance, from samples on the same line a selected number of samples away from the lost sample. The number of samples between the lost sample and the sample used to recover the lost sample, is directly related to the number selected to make up the groups of samples. More particularly, in the preferred embodiment, a sum is taken of the fourth previous sample and the fourth following sample, and the sum is divided by two to provide a replacement sample which is the average value of the two surrounding samples. In the four sample embodiment, the chrominance information is obtained specifically from the fourth previous and fourth following samples, relative to the lost sample. In a three sample embodiment using a 12 MHz sampling rate, the chrominance is obtained specifically from the third previous and following samples. Thus, this algorithm provides coarse luminance and chrominance replacement values for adequate concealment of data when a channel of data is lost.

The second part of the algorithm selects further surrounding samples to thereby add further vertical luminance information, which improves the performance of the first part of the algorithm along vertical lines in the picture material. To this end, the group of four samples on either side of the group of missing samples are summed together. This sum then is subtracted from a sum of the group of four samples located adjacent both above and below the group of four missing samples. The resulting number is divided by eight. Any lost sample then is replaced with a weighted amount of the second part of the algorithm as described below.

By way of example, consider the concealment of the sample identified as S(1,5) in FIG. 2.

Step 1: Calculate H=[S(1,1)+S(1,9)]/2 (This step provides the chrominance information, given a weighting coefficient of one, and also an adequate amount of luminance information to allow concealment).

Step 2: Calculate $HS = S(1,0) + S(1,1) + S(1,2) +$ $S(1,3) + S(1,8) + S(1,9) + S(1,10) + S(1,11)$ Step 3: Calculate $VS = S(0,4) + S(0,5) + S(0,6) +$ $S(0,7) + S(2,4) + S(2,5) + S(2,6) + S(2,7)$ Step 4: Calculate V=[VS−HS]/8 Step 5: Replace with H+([1−w]* V) where 0<=w<=1, H and V are the horizontal and vertical, and HS and VS are the horizontal sum and vertical sum, respectively. The value w represents the weight of the horizontal luminance component versus the vertical luminance component. A typical value for the weighting coefficient w is 0.5, which results in equal weighting of horizontal and vertical information, with acceptable results. As mentioned, a w of one in step 1 above, provides the chrominance.

Figure 6:
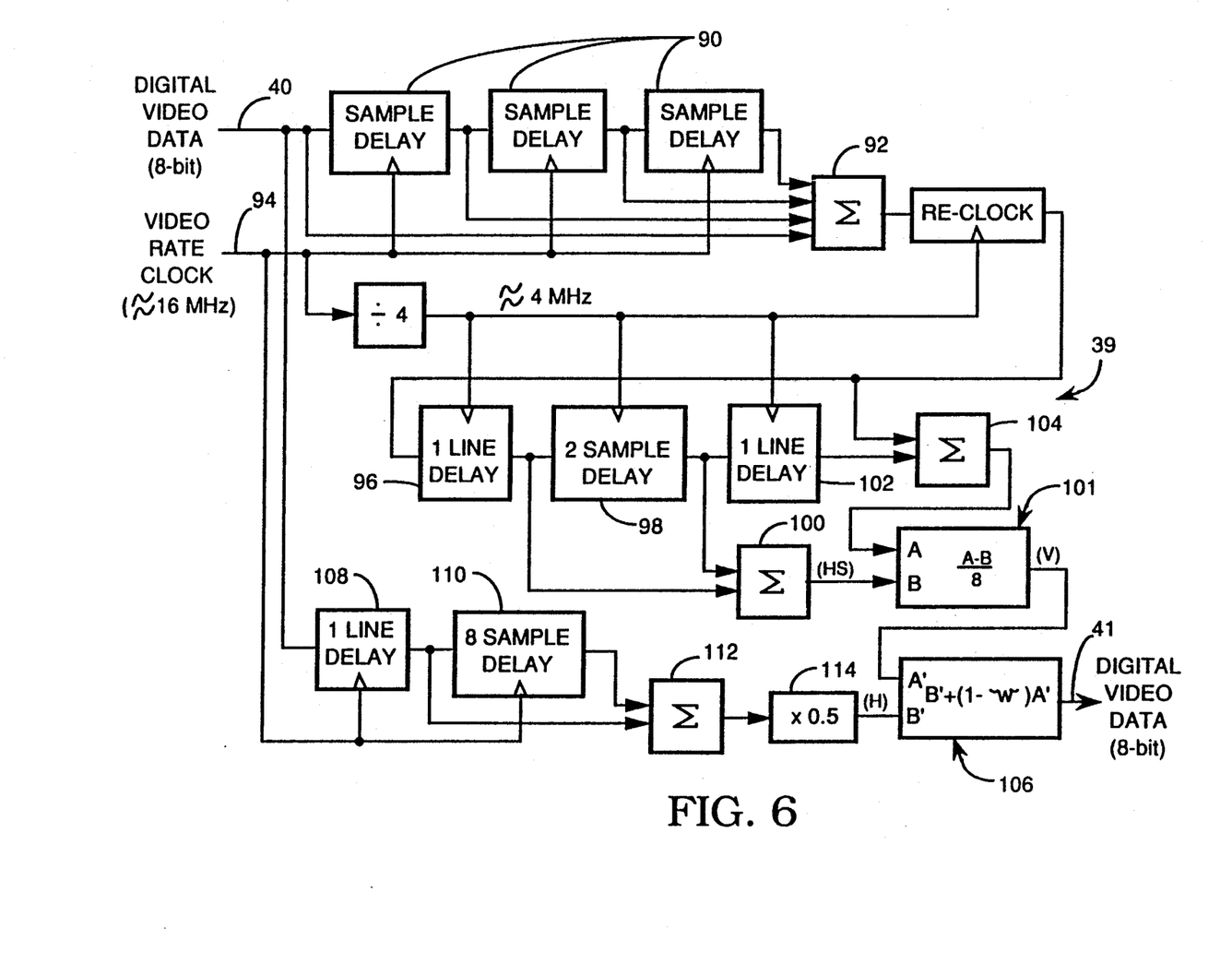
FIG. 6 is a schematic diagram depicting an implementation of a filter for performing concealment in accordance with the invention.

Implementation of the algorithm defined above in hardware is illustrated herein via the circuitry of FIG. 6.

As may be seen, the above step 1 corresponds to the first part of the algorithm of previous mention, while steps 2-5 correspond to the second part. Step 5 describes the weighted combination of the horizontal and vertical luminance components.

FIG. 6 illustrates a filter circuit for performing the concealment process in accordance with the algorithms expressed by the equations discussed above. The digital video data is supplied from the channel multiplexer means 36 via bus 40, to a concealment means depicted herein as filter means 39 comprising a finite impulse response (FIR) filter which is, however, adapted to the equations of steps 1-5 above. To this end, the video data is clocked into three, serial, 1 sample delays 90 by the video rate clock on a line 94. The video data also is supplied to one input of a four input adder 92, whose output is re-clocked at one-fourth the video rate clock into a 1 line (1H) delay 96. A 2 sample delay 98 is coupled to the 1H delay 96 and both delays 96, 98 supply inputs to an adder 100 which, in turn, supplies the HS signal of step 2 of the above concealment technique to the B input of a circuit 101 which performs the function A-B/8.

The 2 sample delay 98 also is coupled to a 1H delay 102 and thence to an adder 104 which also receives the re-clocked video signal from the adder 92. Adder 104 supplies the VS signal of step 3 of the above equations to the A input of the circuit 101. The latter subtracts the HS signal from the VS signal and divides the sum by eight, and supplies the resulting V signal of the step 4 above, to the A' input of a circuit 106 which performs the function wB'+(1−w)A'.

The video data on bus 40 also is clocked into a 1H delay 108 via the video rate clock on line 94, and thence is supplied to an 8 sample delay 110 as well as to an adder 112. The 8 sample delay 110 also is coupled to the adder 112, whose output thence is divided by two as at 114 to supply the H signal of step 1 above. The H signal is coupled to the B' input of the circuit 106 which performs step 5 of the concealment technique to provide the weighted horizontal and vertical luminance and the filtered digital video data on bus 41.

As previously mentioned, the filter 39 of FIG. 6 is, in essence, a FIR filter which is adapted in accordance with the algorithms of previous discussion. More particularly, filter 39 is a long length FIR filter with many zero coefficient taps and locally repeated tap coefficients. The hardware shown (FIG. 6) takes advantage of these situations by using multiple sample and one line delays 96, 98, 102, 108, 110 to account for the many zero coefficient taps, and calculates the sum of four adjacent samples only once via the delays 90 and adder 92. However, the results of this operation are used repeatedly as by adders 100, 104.

Figure 7:
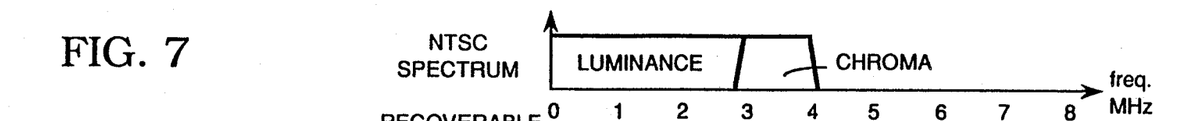
FIGS. 7 and 9 are graphs depicting the frequency spectrums of the luminance and chrominance components of a video signal for the NTSC/PAL and the SECAM color television standards, respectively.
Figure 8:
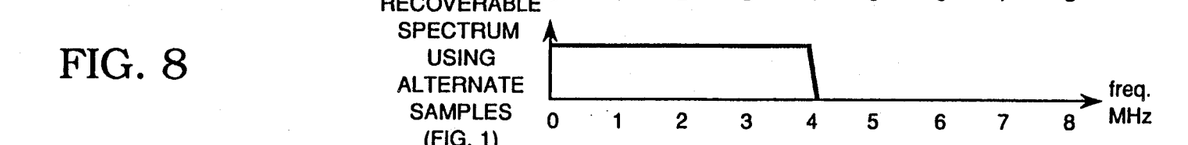
FIGS. 8 and 10-13 are graphs depicting the frequency spectrums which are recoverable utilizing sample distribution groups of 1, 4, 2, 3, and 5 samples per group, respectively, wherein a comparison thereof with the SECAM spectrum of FIG. 9 illustrates the preference of using the four samples per group depicted in FIG. 10, in the preferred embodiment described herein.

By way of further explanation of the invention, the frequency spectrum for a video signal in the NTSC color television standards is pictorially represented in FIG. 7 (PAL is comparable but with different frequencies). The luminance component of the video signal extends over the frequency range of 0 through 5 MHz, while the chrominance component extends from 3 through 5 MHz. Thus, the sample distribution pattern depicted in FIG. 1, formed of single alternate samples distributed to alternate recording channels, works well for the NTSC and PAL standards in the event of a loss of a channel of data. This is true, even though the chrominance information is above the Nyquist limit, because of the coherent phase relationship of adjacent samples as previously discussed. This is depicted in FIG. 8, which shows that the single alternately recorded sample pattern of FIG. 1 provides a recoverable frequency band extending over the frequencies of zero to 4 MHz.

Figure 9:
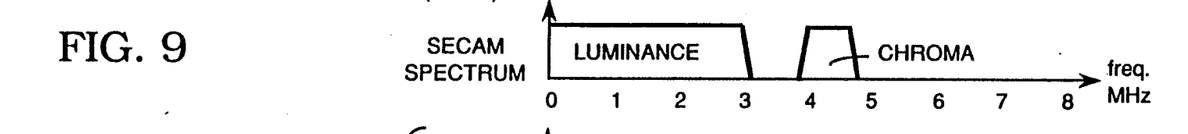

However, as pictorially represented in FIG. 9, the SECAM video spectrum provides luminance in a frequency band of zero to 3 MHz and chrominance in a band of 3.9 to 4.8 MHz. As previously discussed, given a loss of a channel of data, the single alternately recorded sample distribution pattern of FIG. 1 allows recovery of the luminance component but fails to allow recovery of the chrominance in the 3.9 to 4.8 MHz band. This is graphically illustrated in the FIG. 8 which depicts the recoverable spectrum in the frequency band of zero to 4 MHz, which does not encompass the SECAM chrominance band of 3.9 to 4.8 MHz shown in FIG. 9.

Figure 10:
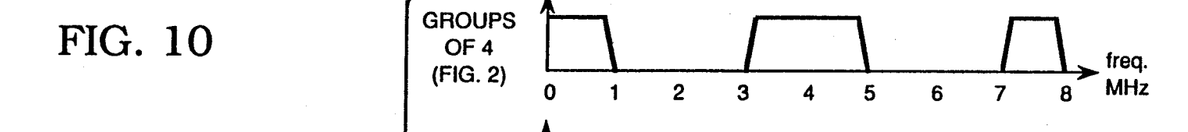

However, as illustrated in FIG. 10, the invention sample distribution pattern of FIG. 2 provides recoverable frequency bands in the regions of zero to 1 MHz and 3 to 5 MHz. A comparison with the SECAM spectrum of FIG. 9 illustrates that sufficient lower frequency luminance and all the chrominance is recoverable, which allows an acceptable concealment of missing data via the associated algorithms, even in the event of a loss of 50% of the data as when a data channel is lost.

Figure 11:
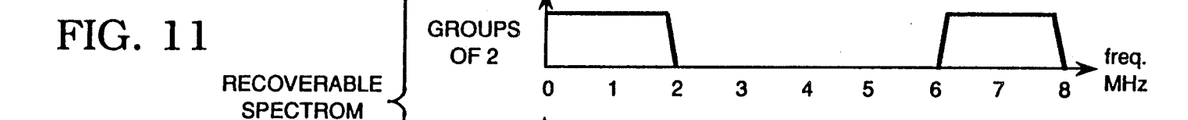
Figure 12:
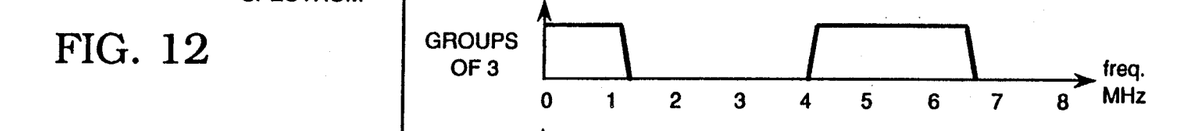
Figure 13:
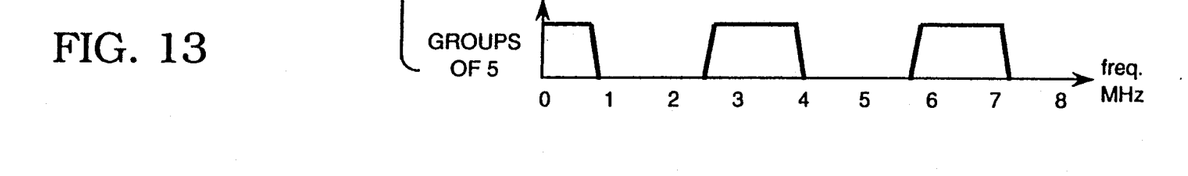

By way of further illustration, FIGS. 11, 12 and 13 depict the recoverable spectrums for sample distribution patterns using groups of two, three and five samples, respectively, given a sampling rate of 16 MHz. In groups of two samples each, the recoverable frequencies are from zero to 2 MHz, and thus within the luminance band of the SECAM system. In groups of three samples each, the recoverable frequencies are from zero to 1⅓ MHz within the SECAM luminance band, and from 4 to 6¾ MHz which provides partial coincidence with the chrominance spectrum. In groups of five samples each, the recoverable frequencies are from zero to ⅘ MHz within the SECAM luminance band, and from 2⅓ to 4 MHz which provides coincidence with a small band of chrominance frequencies.

However, it may be seen that in the event of a loss of a channel, given a sampling of frequency of the order of 16 MHz, the preferred number of samples for the alternately distributed groups is four, with the sample distribution pattern of FIG. 2 and the recovery algorithms based on the number four, as previously described.

It is to be understood, however, that although a specific embodiment is described herein by way of example, various alternative parameters, components and/or environments are contemplated by the invention combination. For example, given a sampling frequency of the order of 12 MHz, the preferred number of samples for the groups in the sample distribution pattern is three, rather than four. To this end, the frequency spectrum for the groups of 3 in FIG. 12, provide a recoverable luminance spectrum of zero to 1 MHz, and chrominance spectrum of 3 to 5 MHz, which provides sufficient information for acceptable concealment.

Furthermore, the invention may be employed in a storage apparatus other than a digital videotape record/playback apparatus; for example, it may be used in a still store, disc or other storage apparatus having two or more channels. In fact, the present distribution and recovery technique is not limited to the environment of a storage apparatus, but further may be used in, for example, apparatus such as a transmission system, wherein signals are being transmitted from a source, such as a satellite, to a receiver via at least two channels in real time. In addition, the present distribution and recovery technique may be adapted for the above-mentioned systems with more than two channels.

What is claimed is:

1. A system for concealing lost data composed of video samples of a non-synchronous color television standard video signal which includes luminance and chrominance in a given frequency spectrum, comprising:
    means for supplying said video samples at a sampling rate which is non-synchronous to said chrominance;
    means receiving said non-synchronously sampled digitized video samples for distributing at a related non-synchronous rate a sample distribution pattern of alternate groups, said groups being formed of a number of samples consistent with the non-synchronous sampling rate which provides sufficient recovery of the luminance and chrominance frequency spectrum to allow concealing the lost data;
    means for selectively recovering said alternate groups formed of said number of samples; and
    means coupled to the recovering means and responsive to the loss of data for replacing the lost data with the luminance and chrominance information within said frequency spectrum.

2. The system of claim 1 wherein:
    said distributing means includes sample memory means for storing the alternate groups of samples, and switching means for selectively directing the stored alternate groups in accordance with said sample distribution pattern and at said related non-synchronous rate; and
    said recovering means includes multiplexing means for recombining the alternate groups formed of said number of samples into a continuous data stream at the related non-synchronous rate.

3. The system of claim 1 wherein the samples are sampled at a non-synchronous rate on the order of 12 MHz, wherein said number of samples in a group is three.

4. The system of claim 1 wherein the samples are sampled at a non-synchronous rate on the order of 16 MHz, wherein said number of samples in a group is four.

5. The system of claim 4 wherein the replacing means includes:
    filter means coupled to the recovering means and responsive to the loss of a substantial amount of data of from 10% to 50%, for replacing the lost data with information taken from four adjacent samples before and after the lost data.

6. The system of claim 5 wherein the filter means further takes replacement information from four adjacent samples above and below the lost data.

7. The system of claim 1 further including:
    control means coupled to the distributing means, the recovering means and the replacing means, for supplying thereto timing pulses including a video clock which have said rates which are non-synchronous to said chrominance.

8. A system for concealing lost data composed of digitized video samples of horizontal lines of a non-synchronous color television standard video signal via a pair of digital data channels, comprising:
- means for supplying said video samples at a sampling rate which is non-synchronous to said chrominance, with no specific phase relationship among the samples;
- means receiving said digitized video samples for alternately distributing to the pair of digital data channels at a related non-synchronous rate, successive groups formed of a selected number of samples commensurate with said non-synchronous sampling rate which, given the loss of a substantial amount of data, provide sufficient recoverable chrominance and luminance information to allow acceptable concealment of the lost data;
- means for recovering from the pair of digital data channels at said related non-synchronous rate, the successive groups of samples, wherein each group has the selected number of samples; and
- means responsive to the substantial loss of the data for concealing the lost data with the chrominance and luminance information from samples horizontally spaced away a number of samples equal to the number of samples in the groups.

9. The system of claim 8 wherein the non-synchronous sampling rate is substantially 16 MHz, and the lost data is replaced in accordance with the equation H=]S(1,1)+S(1,9)]/2, wherein H is the chrominance and luminance information, S(1,1) is the fourth previous sample, and S(1,9) is the fourth following sample.

10. The system of claim 8 wherein the concealing means is responsive to the loss of a data channel for replacing the lost data with a combination of chrominance and luminance information from a number of horizontally adjacent samples before and after the lost data, and vertical luminance information from the same number of adjacent samples above and below the lost data, said number being equal to the number of samples in the groups.

11. The system of claim 8 wherein the lost data is concealed in accordance with the equations $H = [S(1,1) + S(1,9)]/2$ $HS = S(1,0) + S(1,1) + S(1,2) + S(1,3) + S(1,8) + S(1,9) + S(1,10) + S(1,11)$ $VS = S(0,4) + S(0,5) + S(0,6) + S(0,7) + S(2,4) + S(2,5) + S(2,6) + S(2,7)$ $V = [VS - HS]/8$ Replace with $H+([1-w]*V)$ where; $0<=w<=1$, the value w represents the weight of the horizontal luminance component versus the vertical luminance component, H and V are the horizontal and vertical, HS and VS are the horizontal and vertical sums, respectively, and the letter S represents the samples of a sample distribution pattern, wherein the first number in the parentheses defines a video line and the second number therein defines the number of the sample in the lines.

12. The system of claim 8 wherein the non-synchronous sampling rate is substantially 12 MHz, wherein the number of samples per group is three.

13. The system of claim 8 wherein the distributing means further includes:
- means for providing a control signal commensurate with said non-synchronous sampling rate and a related line rate; and
- switching means responsive to said control signal for alternately directing the formed successive groups of samples to alternate channels at a related non-synchronous rate.

14. The system of claim 13 wherein:
- said recovering means includes multiplexing means coupled to the pair of channels and responsive to the control signal, for re-assembling the recovered successive groups of samples into a continuous system of digitized samples; and
- said concealing means includes filter means coupled to the multiplexing means and responsive to the substantial loss of data, for replacing the lost data with information from said number of horizontally adjacent samples before and after the lost data.

* * * * *